(12) United States Patent
Bassett

(10) Patent No.: US 8,763,713 B2
(45) Date of Patent: *Jul. 1, 2014

(54) AGRICULTURAL IMPLEMENT WITH AUTOMATIC DOWN PRESSURE CONTROL

(75) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/359,914

(22) Filed: Jan. 27, 2012

(65) Prior Publication Data

US 2013/0192186 A1 Aug. 1, 2013

(51) Int. Cl.
*A01B 63/00* (2006.01)
*A01B 33/00* (2006.01)

(52) U.S. Cl.
USPC ............. 172/2; 701/50; 111/135; 111/140; 111/143; 111/163; 111/193; 111/200; 111/927

(58) Field of Classification Search
CPC .... A01B 63/114; A01B 63/111; A01B 63/10; A01B 63/02; A01B 63/00; A01B 63/32; A01B 63/24; A01B 63/22; A01B 63/16; A01B 63/008; A01B 61/046; A01B 61/044; A01B 61/04; A01B 61/00; A01B 33/087; A01B 33/08; A01B 33/00; A01B 33/024; A01B 79/005; A01B 79/02; A01C 7/203; A01C 7/205; A01C 7/201; A01C 7/20; A01C 7/208; A01C 7/00; E02F 9/2029; E02F 9/2033; E02F 9/2037; E02F 9/2025; E02F 9/20; E02F 9/00; E02F 9/2271; E02F 9/2264; E02F 9/2257; E02F 9/2221; E02F 9/2217; E02F 9/2207; E02F 9/2203; E02F 9/22; E02F 5/027; E02F 5/02; E02F 5/00

USPC ............. 172/4, 2, 413; 701/50; 111/135, 111/139–143, 157, 163–169, 190–196, 200, 111/900, 927, 963
See application file for complete search history.

(56) References Cited

U.S. PATENT DOCUMENTS

| 114,002 A | 4/1871 | Godfrey |
| 353,491 A | 2/1886 | Wells |

(Continued)

FOREIGN PATENT DOCUMENTS

| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Christopher J Novosad
(74) *Attorney, Agent, or Firm* — Nixon Peabody LLP

(57) ABSTRACT

An agricultural row unit includes a hydraulic cylinder coupled to a support member for urging a soil-engaging tool coupled to the support member downwardly toward the soil. A hydraulic line is coupled to the hydraulic cylinder for supplying pressurized hydraulic fluid to the cylinder, and a controllable valve is provided in the hydraulic line for controlling the supply of pressurized hydraulic fluid to the cylinder through the line. A pressure sensor, such as a load cell or strain gauge, is connected between the hydraulic cylinder and the support member for producing an electrical signal corresponding to the pressure on the tool, and a controller is coupled to the pressure sensor and the controllable valve, the controller being adapted to receive the electrical signal from the pressure sensor and produce a control signal for controlling the valve thus the supply of the hydraulic fluid to the cylinder.

12 Claims, 10 Drawing Sheets

(56) References Cited

U.S. PATENT DOCUMENTS

| | | | |
|---|---|---|---|
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |

(56) References Cited

U.S. PATENT DOCUMENTS

| | | | | |
|---|---|---|---|---|
| 4,930,431 | A | 6/1990 | Alexander | 111/164 |
| 4,986,367 | A | 1/1991 | Kinzenbaw | 172/126 |
| 4,998,488 | A | 3/1991 | Hansson | 111/187 |
| 5,015,997 | A | 5/1991 | Strubbe | 340/684 |
| 5,027,525 | A | 7/1991 | Haukaas | 33/624 |
| 5,033,397 | A | 7/1991 | Colburn, Jr. | 111/118 |
| 5,065,632 | A | 11/1991 | Reuter | 73/861.73 |
| 5,074,227 | A | 12/1991 | Schwitters | |
| 5,076,180 | A | 12/1991 | Schneider | 111/139 |
| 5,092,255 | A | 3/1992 | Long et al. | 111/167 |
| 5,113,957 | A | 5/1992 | Tamai et al. | 172/10 |
| 5,129,282 | A | 7/1992 | Bassett et al. | 74/529 |
| 5,136,934 | A | 8/1992 | Darby, Jr. | 100/125 |
| 5,190,112 | A | 3/1993 | Johnston et al. | 172/245 |
| 5,234,060 | A | 8/1993 | Carter | 172/413 |
| 5,240,080 | A | 8/1993 | Bassett et al. | 172/740 |
| 5,255,617 | A | 10/1993 | Williams et al. | 111/140 |
| 5,269,237 | A | 12/1993 | Baker et al. | 111/121 |
| 5,282,389 | A | 2/1994 | Faivre et al. | 73/861.73 |
| 5,285,854 | A | 2/1994 | Thacker et al. | 172/176 |
| 5,333,694 | A | 8/1994 | Roggenbuck et al. | 172/156 |
| 5,337,832 | A | 8/1994 | Bassett | 172/504 |
| 5,341,754 | A | 8/1994 | Winterton | 111/139 |
| 5,346,019 | A | 9/1994 | Kinzenbaw et al. | 172/311 |
| 5,346,020 | A | 9/1994 | Bassett | 172/540 |
| 5,349,911 | A | 9/1994 | Holst et al. | 111/139 |
| 5,351,635 | A | 10/1994 | Hulicsko | 111/135 |
| 5,379,847 | A | 1/1995 | Snyder | 172/128 |
| 5,394,946 | A | 3/1995 | Clifton et al. | 172/139 |
| 5,398,771 | A | 3/1995 | Hornung et al. | 172/311 |
| 5,419,402 | A | 5/1995 | Heintzman | 172/551 |
| 5,427,192 | A | 6/1995 | Stephenson et al. | 180/53.1 |
| 5,443,023 | A | 8/1995 | Carroll | 111/191 |
| 5,443,125 | A | 8/1995 | Clark et al. | 172/608 |
| 5,461,995 | A | 10/1995 | Winterton | 111/139 |
| 5,462,124 | A | 10/1995 | Rawson | 172/569 |
| 5,473,999 | A | 12/1995 | Rawson et al. | 111/127 |
| 5,477,682 | A | 12/1995 | Tobiasz | 60/583 |
| 5,477,792 | A | 12/1995 | Bassett et al. | 111/121 |
| 5,479,868 | A | 1/1996 | Bassett | 111/139 |
| 5,479,992 | A | 1/1996 | Bassett | 172/4 |
| 5,485,796 | A | 1/1996 | Bassett | 111/33 |
| 5,485,886 | A | 1/1996 | Bassett | 172/763 |
| 5,497,717 | A | 3/1996 | Martin | 111/191 |
| 5,497,837 | A | 3/1996 | Kehrney | 172/619 |
| 5,499,683 | A | 3/1996 | Bassett | 172/4 |
| 5,499,685 | A | 3/1996 | Downing, Jr. | 172/699 |
| 5,517,932 | A | 5/1996 | Ott et al. | 111/193 |
| 5,524,525 | A * | 6/1996 | Nikkel et al. | 91/179 |
| 5,531,171 | A | 7/1996 | Whitesel et al. | 111/139 |
| 5,542,362 | A | 8/1996 | Bassett | 111/120 |
| 5,544,709 | A | 8/1996 | Lowe et al. | 172/661 |
| 5,562,165 | A | 10/1996 | Janelle et al. | 172/4 |
| 5,590,611 | A | 1/1997 | Smith | 111/127 |
| 5,603,269 | A | 2/1997 | Bassett | 111/52 |
| 5,623,997 | A | 4/1997 | Rawson et al. | 172/156 |
| 5,640,914 | A | 6/1997 | Rawson | 111/140 |
| 5,657,707 | A | 8/1997 | Dresher et al. | 111/139 |
| 5,660,126 | A | 8/1997 | Freed et al. | 111/140 |
| 5,685,245 | A | 11/1997 | Bassett | 111/62 |
| 5,704,430 | A | 1/1998 | Smith et al. | 172/29 |
| 5,709,271 | A | 1/1998 | Bassett | 172/4 |
| 5,727,638 | A | 3/1998 | Wodrich et al. | 172/414 |
| 5,852,982 | A | 12/1998 | Peter | 111/118 |
| 5,868,207 | A | 2/1999 | Langbakk et al. | 172/274 |
| 5,878,678 | A | 3/1999 | Stephens et al. | 111/139 |
| RE36,243 | E | 7/1999 | Rawson et al. | 111/121 |
| 5,970,891 | A | 10/1999 | Schlagel | 111/135 |
| 5,970,892 | A | 10/1999 | Wendling et al. | 111/139 |
| 5,988,293 | A | 11/1999 | Brueggen et al. | 172/414 |
| 6,067,918 | A | 5/2000 | Kirby | 111/121 |
| 6,164,385 | A | 12/2000 | Buchl | 172/239 |
| 6,223,663 | B1 | 5/2001 | Wendling et al. | 111/139 |
| 6,223,828 | B1 | 5/2001 | Paulson et al. | 171/63 |
| 6,237,696 | B1 | 5/2001 | Mayerle | 172/558 |
| 6,253,692 | B1 | 7/2001 | Wendling et al. | 111/139 |
| 6,314,897 | B1 | 11/2001 | Hagny | 111/192 |
| 6,325,156 | B1 | 12/2001 | Barry | 172/518 |
| 6,330,922 | B1 | 12/2001 | King | 172/166 |
| 6,331,142 | B1 | 12/2001 | Bischoff | 460/112 |
| 6,343,661 | B1 | 2/2002 | Thomspon et al. | 172/444 |
| 6,347,594 | B1 | 2/2002 | Wendling et al. | 111/167 |
| 6,382,326 | B1 | 5/2002 | Goins et al. | 172/239 |
| 6,389,999 | B1 | 5/2002 | Duello | 111/200 |
| 6,453,832 | B1 | 9/2002 | Schaffert | 111/150 |
| 6,454,019 | B1 | 9/2002 | Prairie et al. | 172/677 |
| 6,460,623 | B1 | 10/2002 | Knussman et al. | 172/4 |
| 6,516,595 | B2 | 2/2003 | Rhody et al. | 56/10.2 E |
| 6,530,334 | B2 | 3/2003 | Hagny | 111/189 |
| 6,575,104 | B2 | 6/2003 | Brummelhuis | 111/139 |
| 6,644,224 | B2 | 11/2003 | Bassett | 111/157 |
| 6,701,856 | B1 | 3/2004 | Zoke et al. | 111/121 |
| 6,701,857 | B1 | 3/2004 | Jensen et al. | 111/200 |
| 6,786,130 | B2 | 9/2004 | Steinlage et al. | 91/390 |
| 6,834,598 | B2 | 12/2004 | Jüptner | 111/140 |
| 6,840,853 | B2 | 1/2005 | Foth | 460/111 |
| 6,886,650 | B2 | 5/2005 | Bremmer | 180/89.13 |
| 6,889,943 | B2 | 5/2005 | Dinh et al. | 248/34 |
| 6,912,963 | B2 | 7/2005 | Bassett | 111/163 |
| 6,986,313 | B2 | 1/2006 | Halford et al. | 111/186 |
| 6,997,400 | B1 | 2/2006 | Hanna et al. | 239/383 |
| 7,004,090 | B2 | 2/2006 | Swanson | 111/119 |
| 7,044,070 | B2 | 5/2006 | Kaster et al. | 111/62 |
| 7,063,167 | B1 | 6/2006 | Staszak et al. | 172/328 |
| 7,159,523 | B2 | 1/2007 | Bourgault et al. | 111/187 |
| 7,222,575 | B2 | 5/2007 | Bassett | 111/140 |
| 7,290,491 | B2 | 11/2007 | Summach et al. | 111/181 |
| 7,360,494 | B2 | 4/2008 | Martin | 111/164 |
| 7,360,495 | B1 | 4/2008 | Martin | 111/164 |
| 7,438,006 | B2 | 10/2008 | Mariman et al. | 111/164 |
| 7,451,712 | B2 | 11/2008 | Bassett et al. | 111/140 |
| 7,523,709 | B1 | 4/2009 | Kiest | 111/119 |
| 7,540,333 | B2 | 6/2009 | Bettin et al. | 172/744 |
| 7,575,066 | B2 | 8/2009 | Bauer | 172/540 |
| 7,584,707 | B2 | 9/2009 | Sauder et al. | 111/140 |
| 7,665,539 | B2 | 2/2010 | Bassett et al. | 172/540 |
| 7,673,570 | B1 | 3/2010 | Bassett | 111/63 |
| 7,743,718 | B2 | 6/2010 | Bassett | 111/135 |
| 7,870,827 | B2 | 1/2011 | Bassett | 111/119 |
| 7,938,074 | B2 | 5/2011 | Liu | 111/200 |
| 7,946,231 | B2 | 5/2011 | Martin et al. | 111/60 |
| 8,380,356 | B1 | 2/2013 | Zielke et al. | 700/284 |
| 8,386,137 | B2 | 2/2013 | Sauder et al. | 701/50 |
| 8,393,407 | B2 | 3/2013 | Freed | 172/551 |
| 8,408,149 | B2 | 4/2013 | Rylander | 111/140 |
| 8,544,397 | B2 * | 10/2013 | Bassett | 111/167 |
| 8,544,398 | B2 * | 10/2013 | Bassett | 111/167 |
| 8,550,020 | B2 | 10/2013 | Sauder et al. | 111/200 |
| 8,573,319 | B1 | 11/2013 | Casper et al. | 172/4 |
| 8,634,992 | B2 | 1/2014 | Sauder et al. | 701/50 |
| 2002/0162492 | A1 | 11/2002 | Juptner | 111/140 |
| 2006/0102058 | A1 | 5/2006 | Swanson | 111/119 |
| 2006/0191695 | A1 | 8/2006 | Walker et al. | 172/452 |
| 2006/0237203 | A1 | 10/2006 | Miskin | 172/799.5 |
| 2007/0044694 | A1 | 3/2007 | Martin | 111/121 |
| 2007/0272134 | A1 | 11/2007 | Baker et al. | 111/163 |
| 2008/0093093 | A1 | 4/2008 | Sheppard et al. | 172/2 |
| 2008/0236461 | A1 | 10/2008 | Sauder et al. | 111/170 |
| 2008/0256916 | A1 | 10/2008 | Vaske et al. | 56/13.5 |
| 2010/0019471 | A1 | 1/2010 | Ruckle et al. | 280/504 |
| 2010/0108336 | A1 | 5/2010 | Thomson et al. | 172/795 |
| 2010/0154693 | A1 | 6/2010 | Bassett | 111/123 |
| 2010/0180695 | A1 | 7/2010 | Sauder et al. | 73/862.045 |
| 2010/0198529 | A1 | 8/2010 | Sauder et al. | 702/41 |
| 2010/0282480 | A1 | 11/2010 | Breker et al. | 172/170 |
| 2010/0300710 | A1 | 12/2010 | Bassett | 172/1 |
| 2011/0036602 | A1 | 2/2011 | Bassett | 172/1 |
| 2011/0088603 | A1 | 4/2011 | Bassett | 111/121 |
| 2011/0247537 | A1 | 10/2011 | Freed | 111/140 |
| 2011/0313575 | A1 | 12/2011 | Kowalchuk et al. | 700/282 |
| 2012/0060730 | A1 | 3/2012 | Bassett | 111/149 |
| 2012/0060731 | A1 | 3/2012 | Bassett | 111/149 |
| 2012/0186216 | A1 | 7/2012 | Vaske et al. | 56/367 |
| 2012/0216731 | A1 | 8/2012 | Schilling et al. | 111/69 |

(56) References Cited

U.S. PATENT DOCUMENTS

| | | | |
|---|---|---|---|
| 2012/0232691 A1 | 9/2012 | Green et al. | 700/231 |
| 2012/0255475 A1 | 10/2012 | Mariman et al. | 111/149 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2014/0026748 A1 | 1/2014 | Stoller et al. | 91/418 |
| 2014/0034339 A1 | 2/2014 | Sauder et al. | 172/2 |
| 2014/0034343 A1 | 2/2014 | Sauder et al. | 172/664 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| EP | 2 497 348 A1 | 9/2012 | A01B 79/00 |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2011/161140 A1 | 12/2011 | A01C 7/20 |
| WO | WO 2012/149367 A1 | 1/2012 | A01C 5/00 |
| WO | WO 2012/149415 A1 | 1/2012 | A01B 63/111 |
| WO | WO 2012/167244 A1 | 12/2012 | A01B 5/00 |
| WO | WO 2013/025898 A1 | 2/2013 | B60C 23/02 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application*," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields*," Top Producer, A Farm Journal Publication, Nov. 1991, pp. 12-14 (4 pages).

Borgelt, Steven C., "*Sensor Technologies and Control Strategies For Managing Variability*," University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Finck, Charlene, "*Listen to Your Soil*," Farm Journal Article, Jan. 1993, pp. 14-15 (2 pages).

Acu-Grain, "*Combine Yield Monitor 99% Accurate? 'You Bet Your Bushels!!*'" date estimated as early as Feb. 1993 (2 pages).

John Deere, New 4435 Hydro Row-Crop and Small-Grain Combine, date estimated as early as Feb. 1993 (8 pages).

Vansichen, R. et al., "*Continuous Wheat Yield Measurement On A Combine*," date estimated as early as Feb. 1993 (5 pages).

Martin Industries, LLC Paired 13" Spading Closing Wheels Brochure, date estimated as early as Jun. 6, 2012, pp. 18-25 (8 pages).

Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).

Yetter 2010 Product Catalog, date estimated as early as Jan. 2010 (2 pages).

Yetter Cut and Move Manual, Sep. 2010 (28 pages).

John Deere, Seat Catalog, date estimated as early Sep. 2011 (19 pages).

Vogt, Willie, "*Revisiting Robotics*," http://m.farmindustrynews.com/farm-equipment/revisiting-robotics, Dec. 19, 2013 (3 pages).

John Deere, New Semi-Active Sea Suspension, http://www.deere.com/en_US/parts/agparts/semiactiveseat.html, date estimated as early as Jan. 2014, retrieved Feb. 6, 2014 (2 pages).

\* cited by examiner

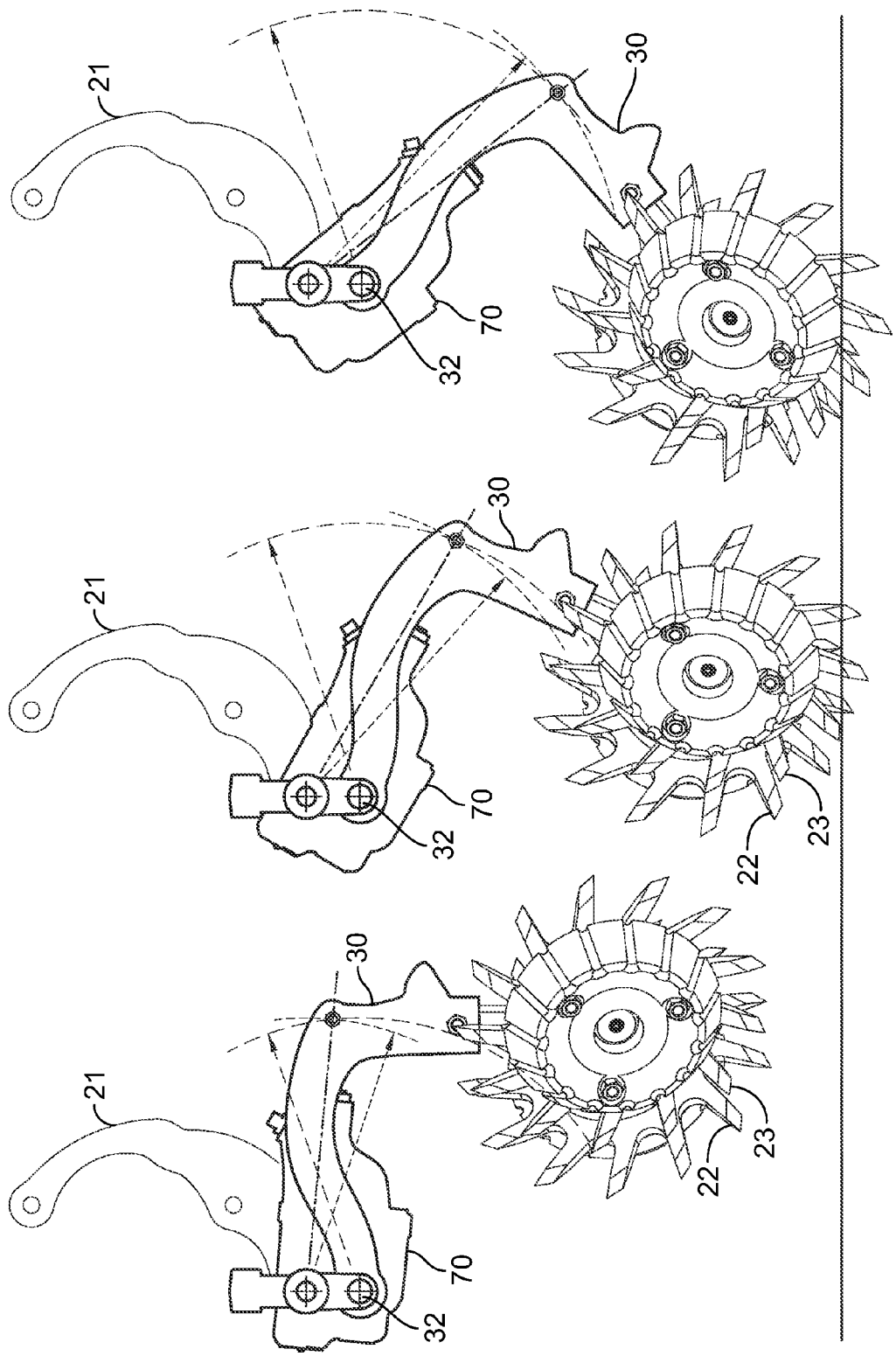

AGRICULTURAL IMPLEMENT WITH AUTOMATIC DOWN PRESSURE CONTROL

FIELD OF THE INVENTION

The present invention relates to agricultural implements and, more particularly, to an agricultural row unit for use with agricultural implements such as planting row units.

BACKGROUND OF THE INVENTION

As an agricultural planter row unit travels across fields with variable soil types, soil moisture, residue levels and topography, it is difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

At the same time, in many locations there are immovable rocks or other obstructions at or below the soil surface which require the planter row unit to be able to quickly and freely (without undue increase in the row unit down force) rise up and over the obstruction freely and then quickly move back down, leaving a minimum amount of the row unplanted. All this must be accomplished at ground speeds of 6 mph or more. Today's planters typically include many individual row units, at times up to 120 ft wide, each of which may be encountering rocks etc. or have a need to float up or down independently.

Traditionally springs have been used to urge row units downward. Recently air bag systems have been used to overcome some of the drawbacks to air spring systems. Air systems provide a more uniform down force through the vertical range of travel, compared to springs, and are somewhat easier to adjust than springs. However due to the compressibility of air and the relatively large volumes required, changes in air pressure are very cumbersome and not adaptable to very fast change and response to in-cab controls on the go. Air bag systems typically have a very large cross-sectional area in relation to the hose feeding the air spring with pressure, which can provide a large multiplication of force and allow for relatively good isolation of one row unit relative to another. However, air bag systems typically do not allow for rapid change of the force being applied, because of the large volume of the air spring in relation to the cross section of the hose supplying the air.

Prior attempts to use devices such as combination spring/hydraulic shock absorbers do not provide ready adjustment on the go and tend to increase in force when rapidly striking a foreign object such as a rock requiring the row unit to quickly rise and come back down to resume planting. This increase in force levels can cause damage to the planter row unit components.

Some previous down-force systems use a spring and a hydraulic cylinder in series. In these systems the hydraulic cylinder does not directly control row unit down force, but rather is used to vary the amount of spring pressure applied to each unit.

Other systems use hydraulics with a central accumulator. However, with the accumulator separated from the force creating cylinder, pressure spikes can develop when hitting obstructions such as a rock at high speed since oil must be forced through hoses or tubes to the remotely located accumulator. This is especially problematic on planters having 50 or more row units.

As computers and GPS systems have allowed crop production to be managed in a location-specific way as an implement moves through the field, it has become necessary to achieve more rapid changes in the setting or adjustment of the implement. In the case of a planter row unit, it is also necessary to generate a large amount of force. Each individual planter row unit must be able to react to the soil it encounters independently of the other row units.

An air spring can allow for remote adjustment of the planter down pressure without stopping the forward motion of the implement, which is inefficient. Mechanical springs have historically required that the operator stop the implement, get out of the tractor, and make a manual adjustment. The slow rate at which an air spring system can be inflated or deflated means that even if a GPS system determines that a change needs to be made because of a programmed or sensed change in the local soil composition or conditions, by the time the pump can change the air pressure the implement has already moved too far forward of where the change needed to be made. This forces the average grid size in which active adjustments of the planter down pressure can be made to be quite large.

SUMMARY OF THE INVENTION

In one embodiment, an agricultural implement is provided for use with a towing frame hitched to a tractor having a hydraulic system for supplying pressurized hydraulic fluid to the implement. The implement comprises at least one row unit that includes an attachment frame adapted to be rigidly connected to the towing frame, a support member pivotably coupled to the attachment frame to permit vertical pivoting movement of the support member relative to the attachment frame, a soil-engaging tool coupled to the support member, and a hydraulic cylinder coupled to the support member for urging the support member downwardly toward the soil, the hydraulic cylinder including a movable ram extending into the cylinder. A hydraulic line is coupled to the hydraulic cylinder for supplying pressurized hydraulic fluid to the cylinder, and a controllable valve is provided in the hydraulic line for controlling the supply of pressurized hydraulic fluid to the cylinder through the line. A pressure sensor, such as a load cell or strain gauge, is connected between the hydraulic cylinder and the support member for producing an electrical signal corresponding to the pressure on the tool, and a controller is coupled to the pressure sensor and the controllable valve, the controller being adapted to receive the electrical signal from the pressure sensor and produce a control signal for controlling the valve thus the supply of the hydraulic fluid to the cylinder.

In one implementation, the row unit includes multiple soil-engaging tools coupled to multiple support members, multiple hydraulic cylinders coupled to the multiple support members, and multiple pressure sensors each of which is connected between one of the hydraulic cylinders and one of the support members. The controller is adapted to receive electrical signals from all the pressure sensors and produce multiple control signals for controlling all the valves and thus the supply of the hydraulic fluid to all the cylinders.

BRIEF DESCRIPTION OF THE DRAWINGS

The invention may best be understood by reference to the following description taken in conjunction with the accompanying drawings, in which:

FIGS. 4, 5 and 6 are side elevations of the main components of the row-clearing unit shown in FIGS. 1-3 in three different vertical positions.

DETAILED DESCRIPTION OF ILLUSTRATED EMBODIMENTS

Figure 1:
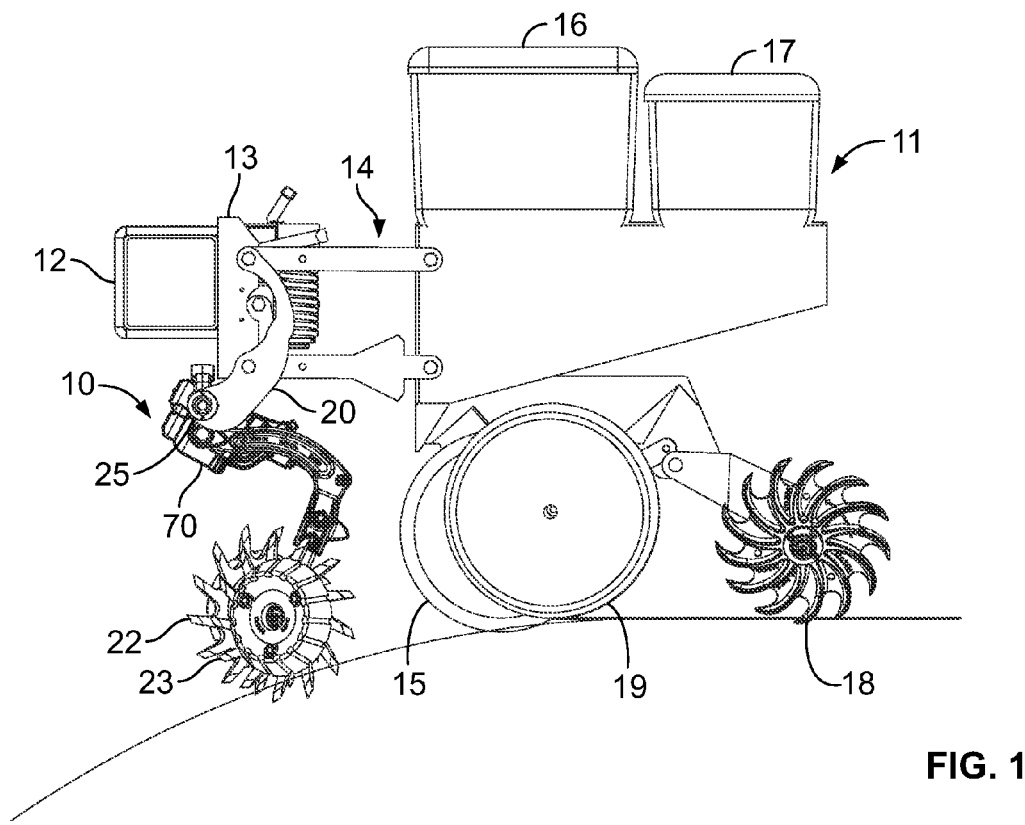
FIG. 1 is a side elevation of a planting row unit and a row-clearing unit, both attached to a towing frame, with the row-clearing unit in a lowered position.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, the illustrative implement includes a row-clearing unit 10 mounted in front of a planting row unit 11. A common elongated hollow towing frame 12 (typically hitched to a tractor by a draw bar) is rigidly attached to the front frame 13 of a four-bar linkage assembly 14 that is part of the row unit 11. The four-bar (sometimes referred to as "parallel-bar") linkage assembly 14 is a conventional and well known linkage used in agricultural implements to permit the raising and lowering of tools attached thereto.

As the planting row unit 11 is advanced by the tractor, a coulter wheel 15 works the soil and then other portions of the row unit part the cleared soil to form a seed slot, deposit seed in the seed slot and fertilizer adjacent to the seed slot, and close the seed slot by distributing loosened soil into the seed slot with a closing wheel 18. A gauge wheel 19 determines the planting depth for the seed and the height of introduction of fertilizer, etc. Bins 16 and 17 on the row unit carry the chemicals and seed which are directed into the soil. The planting row unit 11 is urged downwardly against the soil by its own weight. If it is desired to have the ability to increase this downward force, or to be able to adjust the force, a hydraulic or pneumatic cylinder and/or one or more springs may be added between the front frame 13 and the linkage 14 to urge the row unit downwardly with a controllable force. Such a hydraulic cylinder may also be used to lift the row unit off the ground for transport by a heavier, stronger, fixed-height frame that is also used to transport large quantities of fertilizer for application via multiple residue-clearing and tillage row units. This hydraulic or pneumatic cylinder may be controlled to adjust the downward force for different soil conditions such as is described in U.S. Pat. Nos. 5,709,271, 5,685,245 and 5,479,992.

The row-clearing unit 10 includes an attachment frame that includes a pair of rigid arms 20 and 21 adapted to be rigidly connected to the towing frame 12. In the illustrative embodiment, the arms 20 and 21 are bolted to opposite sides of the front frame 13 of the row unit 11, which in turn is rigidly attached to the towing frame 12. An alternative is to attach the row-clearing unit 10 directly to the towing frame 12. At the bottom of the row-clearing unit 10, a pair of cooperating toothed clearing wheels 22 and 23 are positioned upstream of the coulter wheel 15 of the planting row unit 11.

The clearing wheels 22, 23 are arranged for rotation about transverse axes and are driven by the underlying soil as the wheels are advanced over the soil. The illustrative wheels 22, 23 are a type currently sold by the assignee of the present invention under the trademark TRASHWHEEL. The toothed wheels 22, 23 cooperate to produce a scissors action that breaks up compacted soil and simultaneously clears residue out of the path of planting. The wheels 21 and 22 kick residue off to opposite sides, thus clearing a row for planting. To this end, the lower edges are tilted outwardly to assist in clearing the row to be planted. This arrangement is particularly well suited for strip tilling, where the strip cleared for planting is typically only about 10 inches of the 30-inch center-to-center spacing between planting rows.

Figure 2:
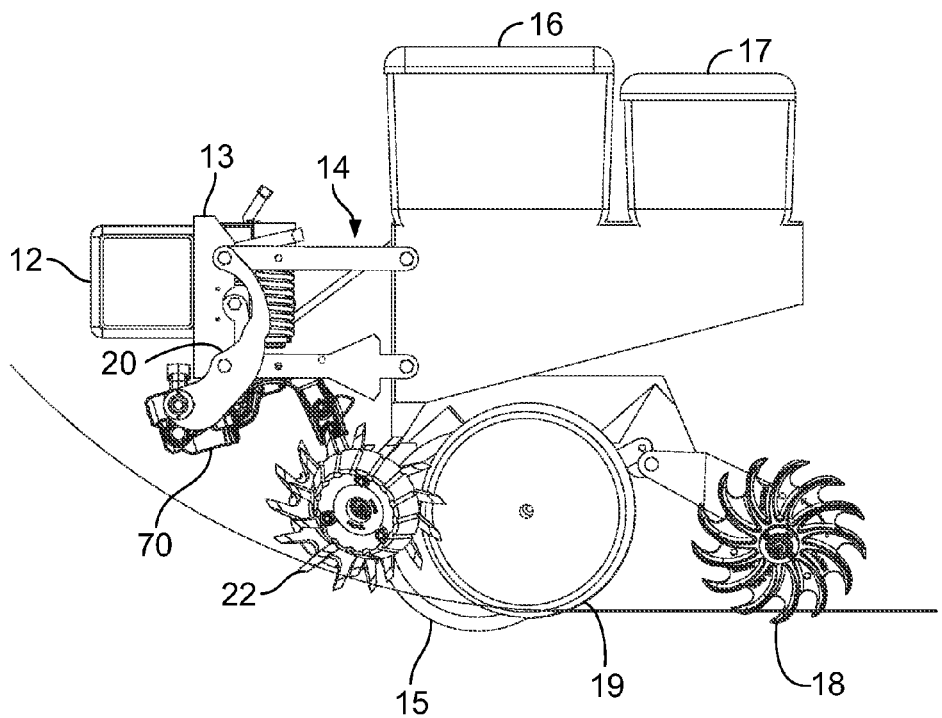
FIG. 2 is the same side elevation shown in FIG. 1 with the row-clearing unit in a raised position.

In FIGS. 1 and 2, the clearing wheels 22 and 23 are shown in two different vertical positions. Specifically, the wheels 22, 23 are in a lower position in FIG. 1, where the elevation of the soil is decreasing, than in FIG. 2, where the soil elevation is increasing.

The row-clearing unit 10 is shown in more detail in FIGS. 3-9. The two frame arms 20, 21 are interconnected by an arched crossbar 24 that includes a pair of journals 25 and 26 for receiving the leading ends of a pair of laterally spaced support arms 30 and 31. The support arms 30, 31 are thus pivotally suspended from the crossbar 24 of the attachment frame, so that the trailing ends of the support arms 30, 31 can be pivoted in an arc around a horizontal axis 32 extending through the two journals 25, 26.

The row-clearing wheels 22 and 23 are mounted on the trailing ends of the support arms 30 and 31, which are bolted or welded together. As can be seen in FIGS. 4-6, the wheels 22, 23 can be raised and lowered by pivoting the support arms 30, 31 around the horizontal axis 32. The pivoting movement of the support arms 30, 31 is controlled by a hydraulic cylinder 70 connected between the fixed crossbar 24 and the trailing ends of the support arms 30, 31. FIGS. 4-6 show the support arms 30, 31, and thus the clearing wheels 22, 23, in progressively lower positions. The downward pressure applied to the support arms 30, 31 to urge the clearing wheels 22, 23 against the soil is also controlled by the hydraulic cylinder 70.

Figure 7:
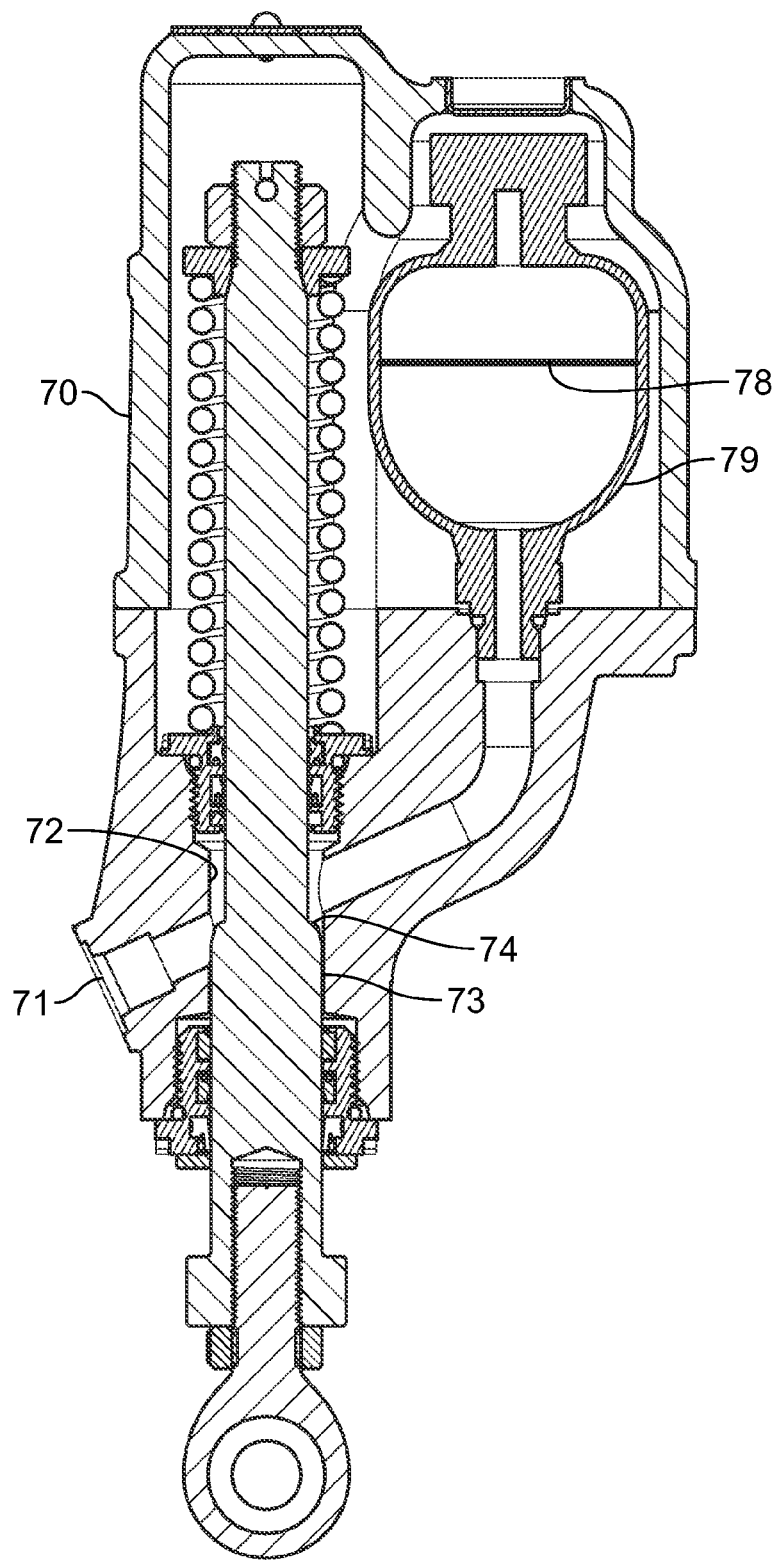
FIGS. 7, 8 and 9 are side elevations of the hydraulic cylinder of the row-clearing unit shown in FIGS. 1-6 with the cylinder rod in three different positions corresponding to the positions shown in FIGS. 5, 6 and 4, respectively.
Figure 8:
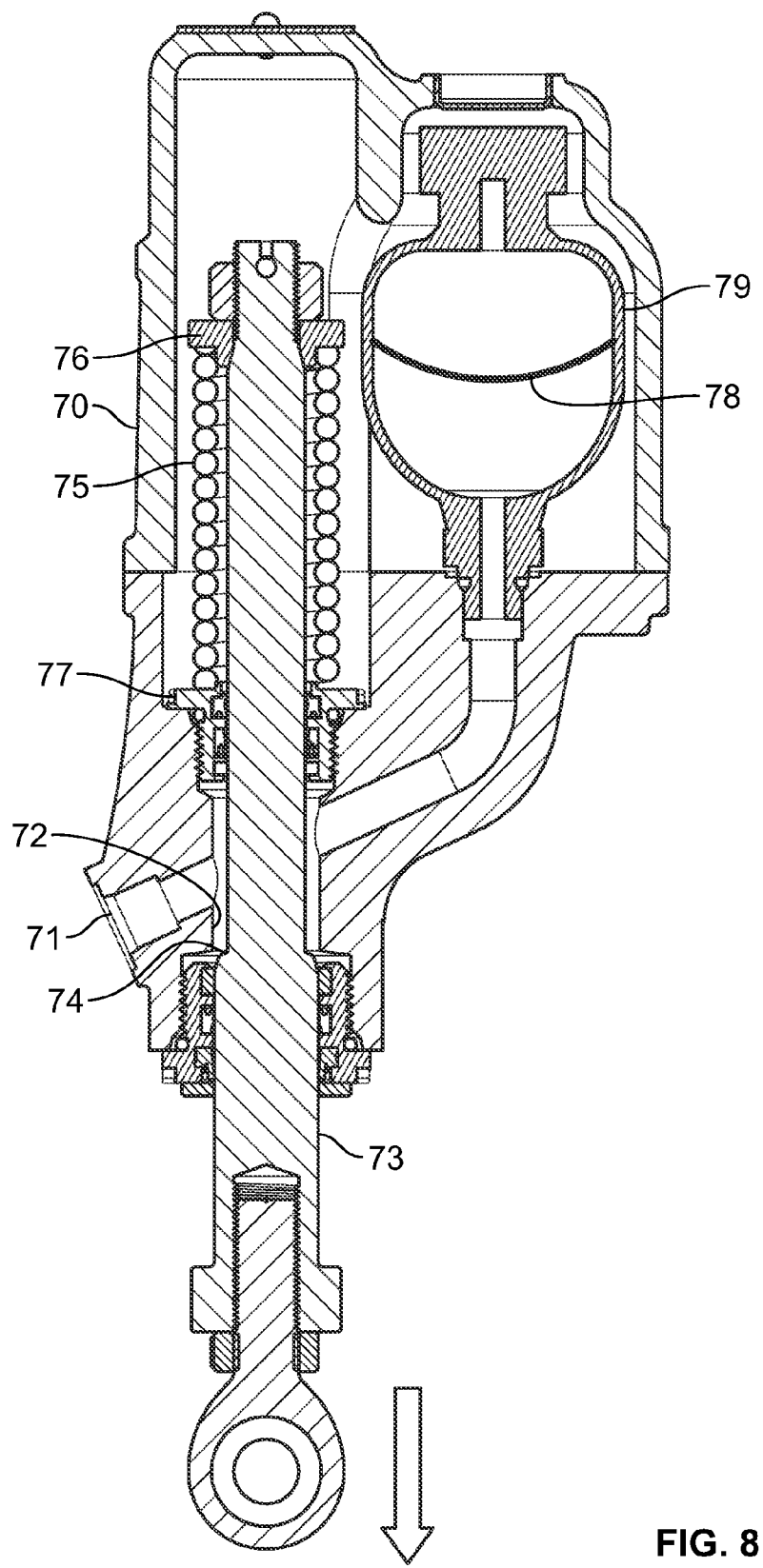
Figure 9:
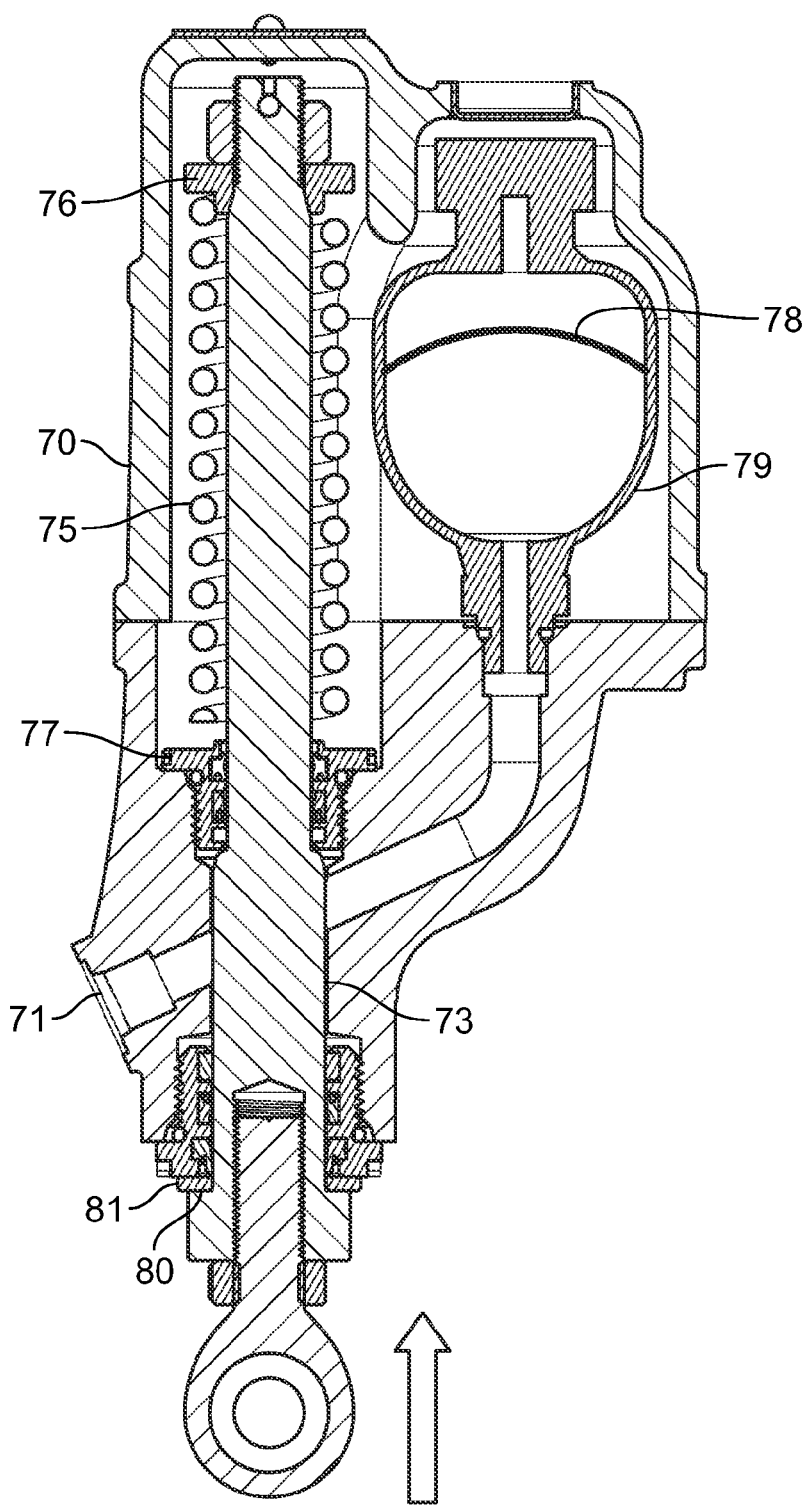

The hydraulic cylinder 70 is shown in more detail in FIGS. 7-9. Pressurized hydraulic fluid from the tractor is supplied by a hose (not shown) to a port 71 that leads into an annular cavity 72 surrounding a rod 73, and then on into an accumulator 79. After the internal cavities connected to the port 71 are filled with pressurized hydraulic fluid, the port is closed by a valve, as will be described in more detail below. The lower end of the annular cavity 72 is formed by a shoulder 74 on the rod 73, so that the hydraulic pressure exerted by the hydraulic fluid on the surface of the shoulder 74 urges the rod 73 downwardly (as viewed in FIGS. 7-9), with a force determined by the pressure of the hydraulic fluid and the area of the exposed surface of the shoulder 74. The hydraulic fluid thus urges the rod 73 in an advancing direction (see FIG. 8).

When the rod 73 is advanced outwardly from the cylinder 70, the rod pivots the support arms 30, 31 downwardly, thereby lowering the clearing wheels 22, 23. Conversely, retracting movement of the rod 73 pivots the support arms 30, 31 upwardly, thereby raising the clearing wheels 22, 23.

The accumulator 79 includes a diaphragm that divides the interior of the accumulator into a hydraulic-fluid chamber 79a and a gas-filled chamber 79b, e.g., filled with pressurized nitrogen. FIG. 7 shows the rod 73 in a position where the diaphragm is not deflected in either direction, indicating that the pressures exerted on opposite sides of the diaphragm are substantially equal. In FIG. 8, the hydraulic force has advanced the rod 73 to its most advanced position, which occurs when the resistance offered by the soil to downward movement of the clearing wheels 22, 23 is reduced (e.g., by softer soil or a depression in the soil).

As can be seen in FIG. 8, advancing movement of the rod 73 is limited by the "bottoming out" of a coil spring 75 located between a flange 76 attached to the inner end of the rod 73 and a flange 77 attached to the interior of the cylinder 70. As the rod 73 is advanced, the coil spring 75 is progressively compressed until it reaches its fully compressed condition illustrated in FIG. 8, which prevents any further advancement of the rod 73. Advancing movement of the rod 73 also expands the size of the annular cavity 72 (see FIG. 8), which causes the diaphragm 78 in the accumulator 79 to deflect to the position illustrated in FIG. 8 and reduce the amount of hydraulic fluid in the accumulator 80. When the rod 73 is in this advanced position, the support arms 30, 31 and the clearing wheels 22, 23 are pivoted to their lowermost positions relative to the row unit 11.

In FIG. 9, the rod 73 has been withdrawn to its most retracted position, which can occur when the clearing wheels 22, 23 encounter a rock or other obstruction, for example. When the rod 73 is in this retracted position, the support arms 30, 31 and the clearing wheels 22, 23 are pivoted to their uppermost positions relative to the row unit. As can be seen in FIG. 9, retracting movement of the rod 73 is limited by engagement of a shoulder 80 on the rod 73 with a ring 81 on the trailing end of the cylinder 70. As the rod 73 is retracted by forces exerted on the clearing wheels 22, 23, the coil spring 75 is progressively expanded, as illustrated in FIG. 9, but still applies a retracting bias to the rod 73.

Retracting movement of the rod 73 virtually eliminates the annular cavity 72 (see FIG. 9), which causes a portion of the fixed volume of hydraulic fluid in the cylinder 70 to flow into the chamber 79a of the accumulator 79, causing the diaphragm 78 to deflect to the position illustrated in FIG. 9. This deflection of the diaphragm 78 into the chamber 79b compresses the gas in that chamber. To enter the chamber 79a, the hydraulic fluid must flow through a restriction 80, which limits the rate at which the hydraulic fluid flows into the accumulator. This controlled rate of flow of the hydraulic fluid has a damping effect on the rate at which the rod 73 retracts or advances, thereby avoiding sudden large movements of the moving parts of the row-clearing unit.

When the external obstruction causing the row cleaners to rise is removed from the clearing wheels, the combined effects of the pressurized gas in the accumulator 79 on the diaphragm 78 and the pressure of the hydraulic fluid move the rod 73 to a more advanced position. This downward force on the clearing wheels 22, 23 holds them against the soil and prevents uncontrolled bouncing of the wheels over irregular terrain, but is not so excessive as to leave a trench in the soil.

The downward force applied to the clearing wheels 22, 23 can be adjusted by changing the pressure of the hydraulic fluid supplied to the cylinder 70.

Figure 10:
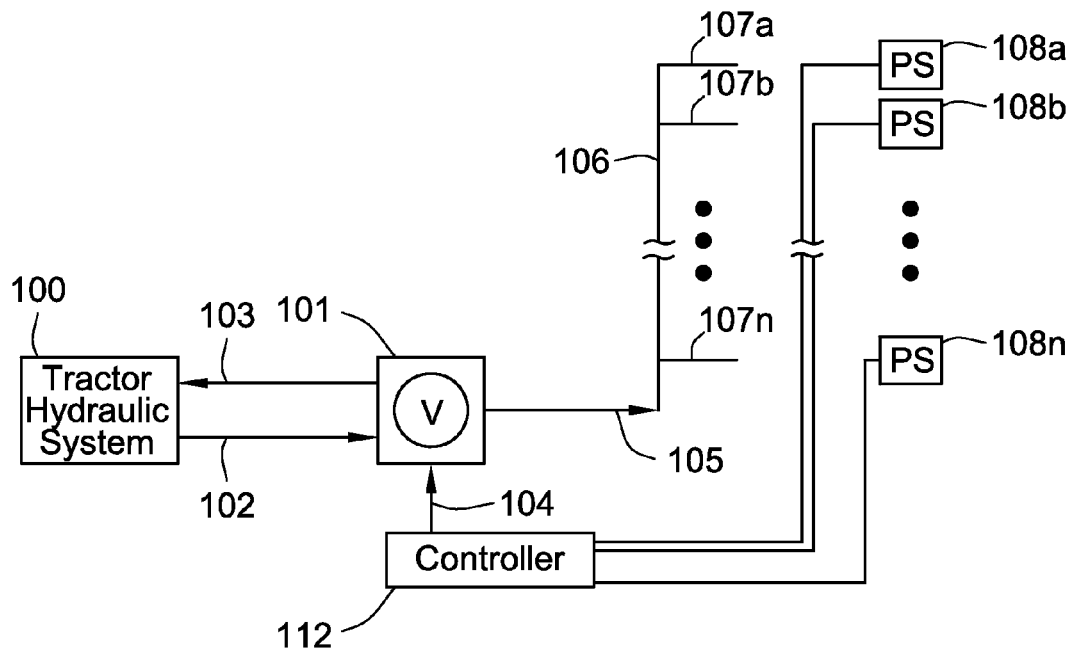
FIG. 10 is a schematic diagram of a first hydraulic control system for use in controlling the row-clearing unit shown in FIGS. 1-6.

FIG. 10 is a schematic of a hydraulic control system for supplying pressurized hydraulic fluid to the cylinders 70 of multiple row units. A source 100 of pressurized hydraulic fluid, typically located on a tractor, supplies hydraulic fluid under pressure to a pressure control valve 101 via supply line 102 and receives returned fluid through a return line 103. The pressure control valve 101 can be set by an electrical control signal S1 on line 104 from a controller 112, to deliver hydraulic fluid to an output line 105 at a desired pressure. The output line 105 is connected to a manifold 106 that in turn delivers the pressurized hydraulic fluid to individual feed lines 107a, 107b . . . 107n connected to the ports 71 of the respective hydraulic cylinders 70 of the individual row units. The row units include respective pressure sensors 108a, 108b . . . 108n that monitor the forces on the tools to which the respective hydraulic cylinders are coupled, and the sensors produce electrical output signals that are fed back to the controller 112 for use in determining a desired setting for the pressure control valve 101.

Figure 11:
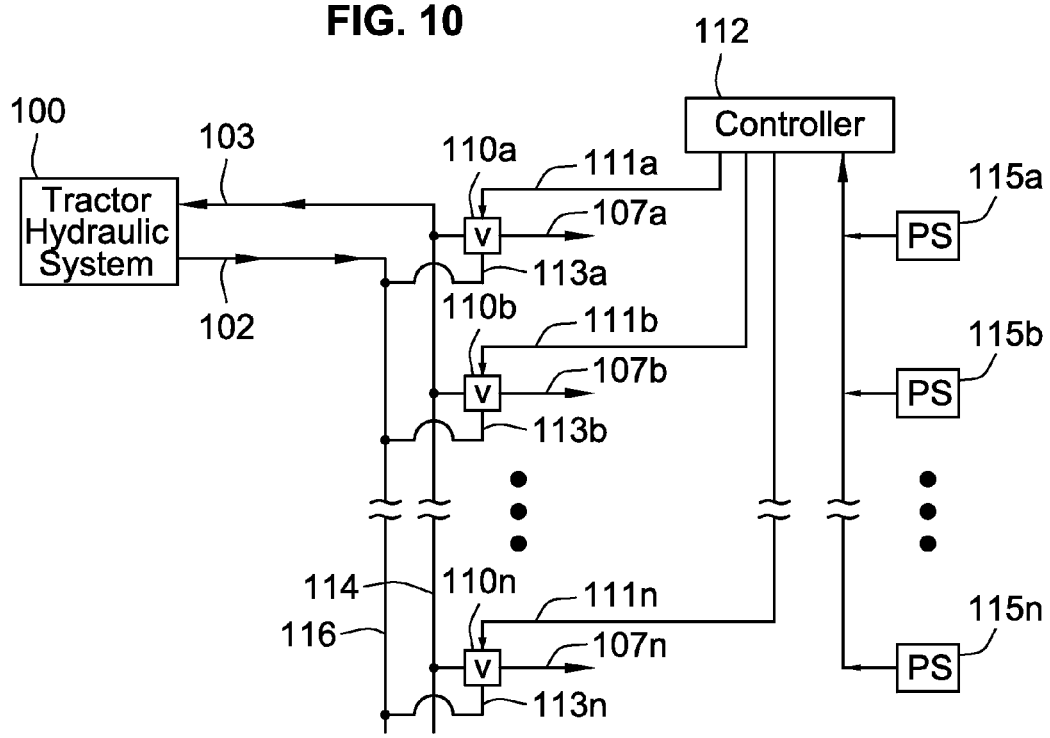
FIG. 11 is a schematic diagram of a second hydraulic control system for use in controlling the row-clearing unit shown in FIGS. 1-6.

FIG. 11 is a schematic of a modified hydraulic control system that permits individual control of the supply of hydraulic fluid to the cylinder of each separate row unit. Portions of this system that are common to those of the system of FIG. 10 are identified by the same reference numbers. The difference in this system is that each of the individual feed lines 107a, 107b . . . 107n leading to the row units is provided with a separate pressure control valve 110a, 110b . . . 110n, respectively, that receives its own separate electrical control signal on one of a plurality of output lines 11a, 111b . . . 111c from an electrical controller 112. This arrangement permits the supply of pressurized hydraulic fluid to each row unit to be controlled by the pressure control valve 110 for that row unit. The individual valves 110a, 110b . . . 110n receive pressurized hydraulic fluid via the manifold 116 and separate supply lines 113a, 113b . . . 113n, and return hydraulic fluid to a sump on the tractor via a return manifold 114 connected back to the return line 103 of the hydraulic system 100 of the tractor.

One benefit of the control systems of FIG. 11 is that as agricultural planters, seeders, fertilizer applicators, tillage equipment and the like become wider with more row units on each frame, often 36 30-inch rows or 54 20-inch rows on a single 90-foot wide toolbar, each row-clearing unit can be controlled independently of every other row-clearing unit. Thus, the down pressure for each row unit can be remotely adjustable from the cab of the tractor or other selected location. This permits very efficient operation of a wide planter or other agricultural machine in varying terrain without having to stop to make manual adjustment to a large number of row units, resulting in a reduction in the number of acres planted in a given time period. One of the most important factors in obtaining a maximum crop yield is timely planting. By permitting remote down force adjustment of each row-clearing unit (or group of units), including the ability to quickly release all down force and let the row cleaner quickly rise, e.g., when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row-clearing unit must often rise or fall quickly to clear a rock or plant into an abrupt soil depression. Any resistance to quick movement results in either gouging of the soil or an uncleared portion of the field and reduced yield. With each row unit having its own separate control, the clearing wheels and the rod of the hydraulic cylinder can move quickly and with a nearly constant down force.

Although the illustrative embodiments described above utilize clearing wheels as the agricultural tools, it should be understood that the invention is also applicable to row units that utilize other agricultural tools, such as fertilizer openers or rollers for firming loose soil.

Figure 12:
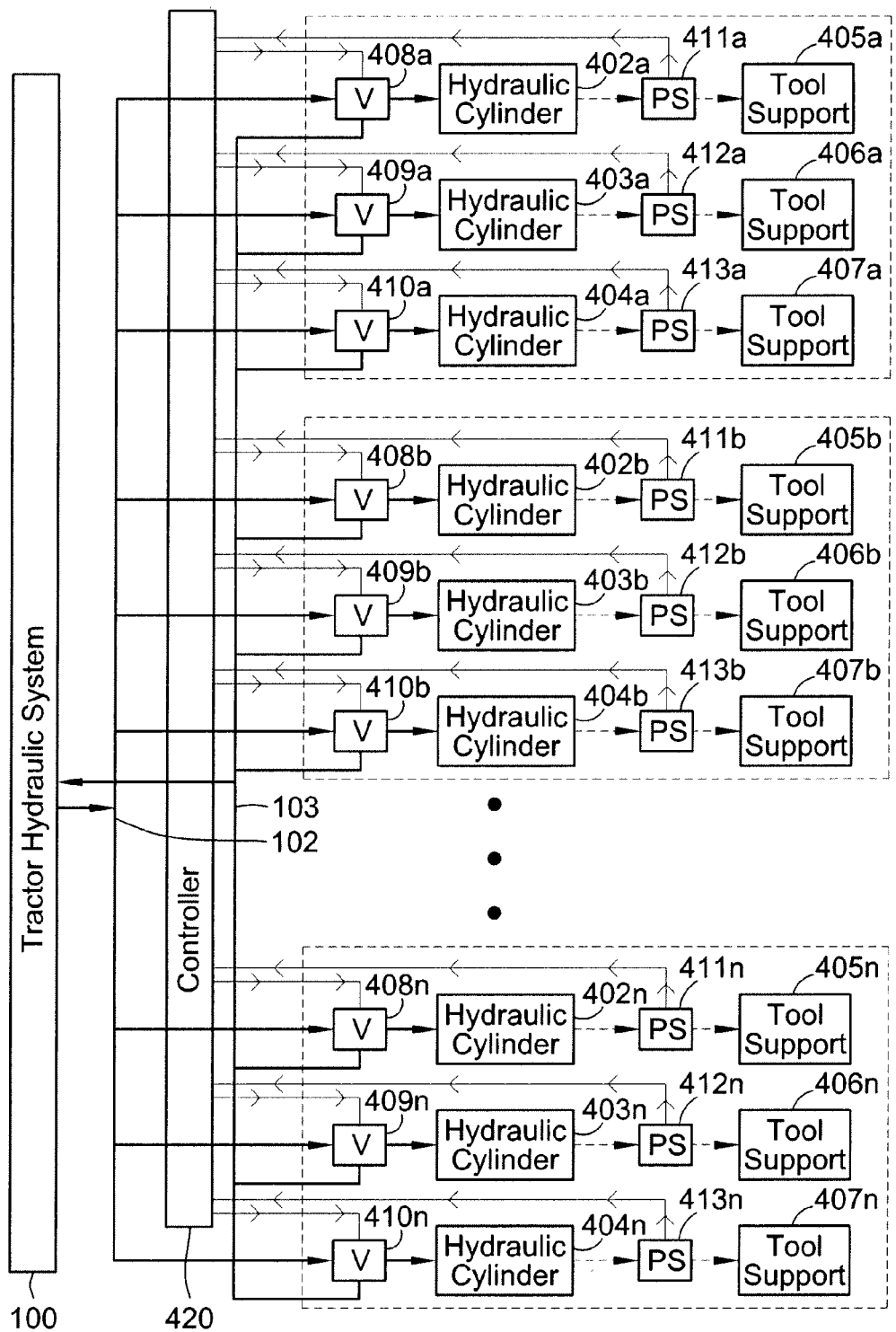
FIG. 12 is a functional block diagram of a hydraulic control system for use with multiple row units.

In order to dynamically control the hydraulic pressure applied to the soil-engaging tools in response to varying soil conditions, each pressure sensor is preferably connected between the ram of each hydraulic actuator 19 and the support member for the tool controlled by that ram. One such system is illustrated in FIG. 12, in which a tractor hydraulic system 100 supplies pressurized hydraulic fluid to multiple row units 401a, 401b . . . 401n. In the illustrative system, each row unit includes three hydraulic cylinders 402, 403 and 404, one for each of three tool support members 405, 406 and 407, and the hydraulic fluid is supplied to each hydraulic cylinder through a separate pressure control valve 408, 409 or 410 via a supply manifold 102 and a return manifold 103. A separate pressure sensor 411, 412 or 413 (e.g., a load cell or strain gauge) is connected between the ram of each of the cylinders 402, 403 and 404 and its associated tool support member 405, 406 or 407, respectively. The electrical output signals from all the pressure sensors 411-413 are sent to a controller 420, which generates a separate control signal for each of the pressure control valves 408, 409 and 410.

In FIG. 12, the components of each row unit have been identified by the same reference numerals used for those same components in the other row units, with the addition of the same distinguishing suffixes used for the row units. For example, in row unit 401a, the three hydraulic cylinders have been designated 402a, 403a and 404a. Only three row units 401a, 401b . . . 401n are shown in FIG. 12, but it will be understood that any number of row units may be used, and it is common practice to have a tractor pull many more than three row units, all of which are coupled to the hydraulic system of the single tractor.

The controller 420 continuously monitors the electrical output signals from the pressure sensors 411-413 and uses those signals to produce a separate control signal for each of the valves 408-410. These signals control the pressure control valves 408-410 to maintain desired hydraulic pressures in the respective hydraulic cylinders 402-404 of all the row units. Consequently, if different row units encounter different soil conditions, those conditions are sensed by the respective pressure sensors 115 and the output signals produced by those sensors cause different hydraulic pressures to be supplied to the different row units, thereby compensating for the particular soil conditions encountered by the different row units. For example, if some or all of the row units 401 move from a region of relatively soft soil into a region of relatively hard soil, the output signals from the pressure sensors 411-413 on those row units will increase. These increases are detected by the controller 420, which then automatically adjusts the control signals supplied to the corresponding valves to increase the hydraulic pressure supplied to the hydraulic cylinders associated with those valves.

The system of FIG. 12 is capable of providing independent control of the down pressure on different tools, such as the clearing wheels and the closing wheels, on the same row unit. The controller 420 receives a separate input signal from the pressure sensor associated with each separate cylinder, and produces a separate control signal for each separate pressure control valve. Thus, the hydraulic pressure supplied to each separate hydraulic cylinder may be separately controlled, independently of all the other cylinders, whether on the same row unit or different row units.

The controller 420 may be programmed to use different algorithms to determine how the hydraulic pressure supplied to any given cylinder is adjusted in response to changes in the signals from the pressure sensor for that cylinder. For example, the controller can simply convert the signal from a given pressure sensor into a proportional signal having a linear relationship with the sensor output signal, to produce a control signal that falls within a suitable range for controlling the corresponding pressure control valve (e.g., within a range of 0-10V). Alternatively, the conversion algorithm can apply a scaling factor or gain to the signal from the sensor as part of the conversion. Filters may also be employed in the conversion process, e.g., to ignore sensor signals above a first threshold value and/or below a second threshold value.

The sensor output signals may also be averaged over a prescribed time period. For example, the signal from each pressure sensor may be sampled at predetermined intervals and averaged over a prescribed time period, so that the control signal supplied to the pressure control valve associated with that sensor does not change abruptly in response to only a brief, temporary change in soil conditions. Certain parameters, such as scaling factors, can be made manually selectable to enable an operator selection to customize the behavior of one or more row units to suit personal preferences. Different "mappings" may also be provided to enable an operator to select predetermined sets of variables correlated to different conditions.

Figure 3:
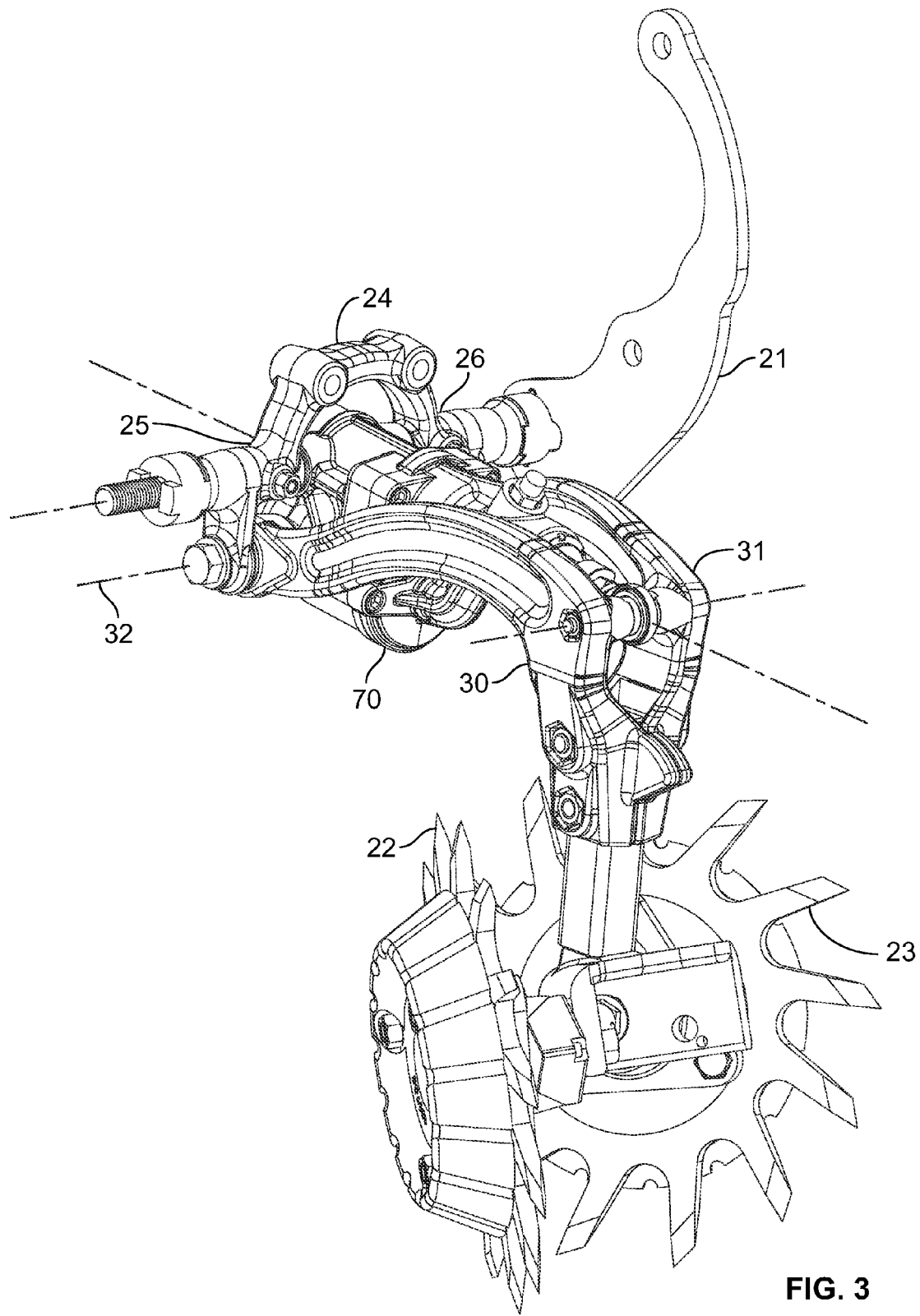
FIG. 3 is an enlarged perspective of the row-clearing unit shown in FIGS. 1 and 2.
Figure 13:
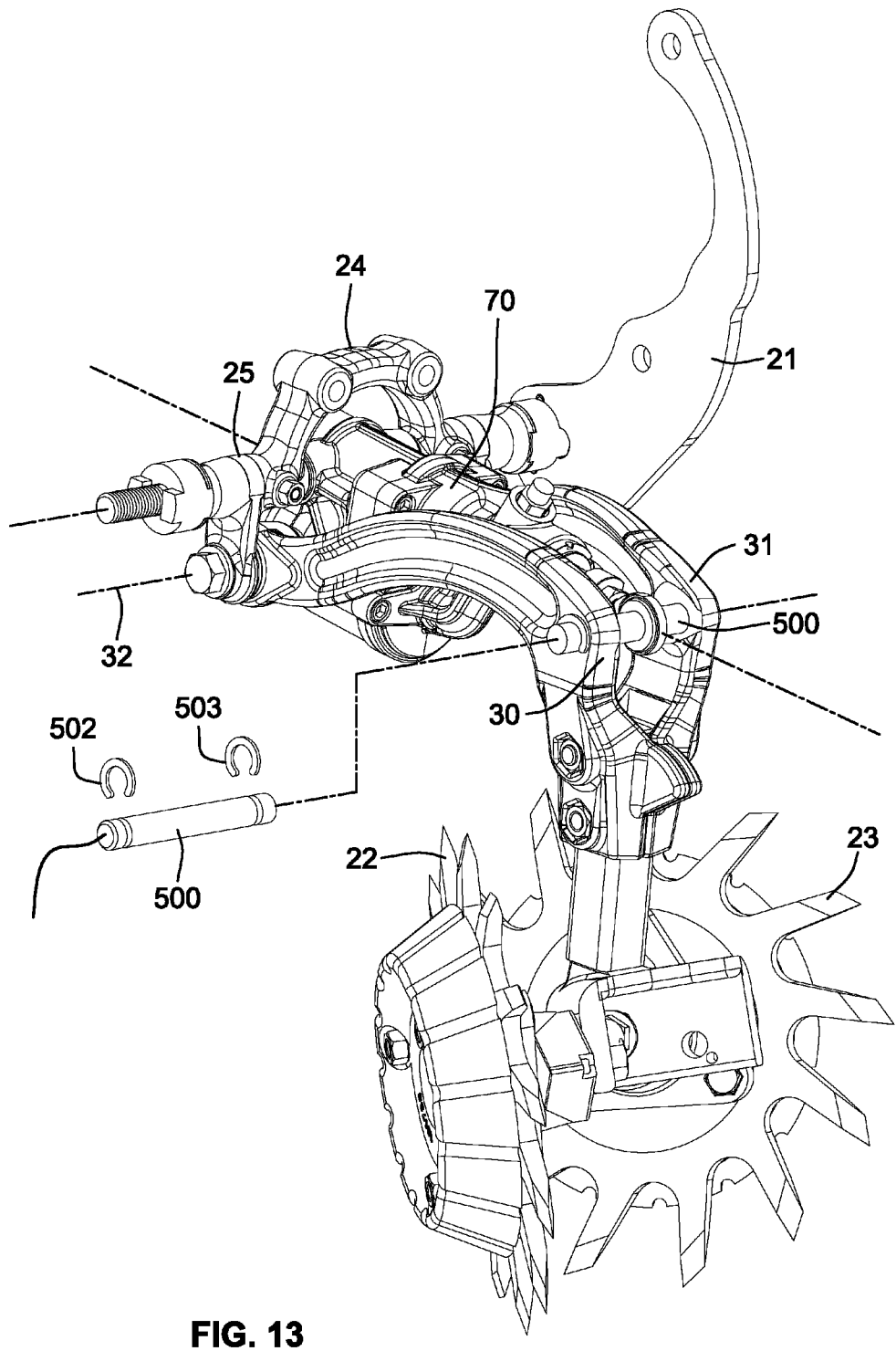
FIG. 13 is a perspective view similar to that of FIG. 3 but modified to include a pressure sensor, in the form of a load cell.
Figure 14:
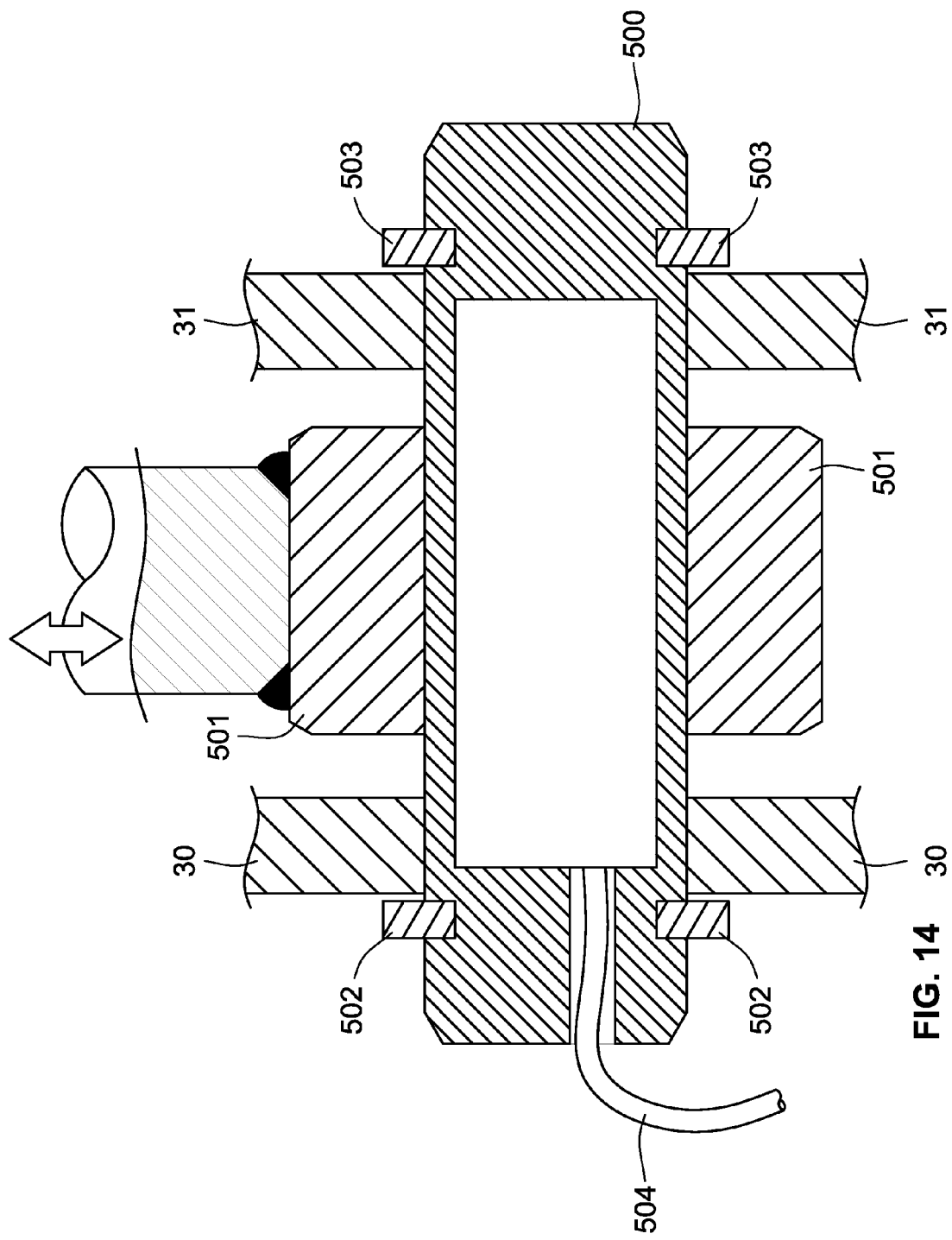
FIG. 14 is an enlarged section view taken longitudinally through the middle of the load cell shown in FIG. 13.

FIGS. 13 and 14 illustrate a load cell 500 integrated into the mechanism of FIG. 3 for sensing the pressure on the clearing wheels 22 and 23. The load cell 500 couples the rod of the hydraulic cylinder 70 to the two arms 30 and 31 that carry the clearing wheels 22 and 23, so that the load cell is subjected to the same forces as the clearing wheels. Specifically, the load cell 500 extends through an annulus 501 attached to the end of the cylinder rod, and the opposite ends of the load cell extend through closely fitting apertures in the arms 30 and 31 and are secured thereto by a pair of C clips 502 and 503. As the forces exerted on the load cell change, the electrical output signal produced by the load cell on its output line 504 changes in proportion to changes in the exerted forces.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural implement for use with a towing frame hitched to a tractor having a hydraulic system for supplying pressurized hydraulic fluid to said agricultural implement, said agricultural implement comprising at least one row unit comprising an attachment frame adapted to be rigidly connected to said towing frame,
a support member pivotably coupled to said attachment frame to permit vertical pivoting movement of said support member relative to said attachment frame,
a soil-engaging tool coupled to said support member,
a hydraulic cylinder coupled to said support member for urging said support member downwardly toward the soil, said hydraulic cylinder including a movable ram extending into said hydraulic cylinder, a hydraulic line coupled to said hydraulic cylinder for supplying pressurized hydraulic fluid to said hydraulic cylinder, a controllable pressure control valve in said hydraulic line for controlling the pressure of hydraulic fluid supplied to said hydraulic cylinder through said line, a pressure sensor connected between said hydraulic cylinder and said support member for producing an electrical signal corresponding to the pressure on said soil-engaging tool, and a controller coupled to said pressure sensor and said controllable pressure control valve, said controller being adapted to receive said electrical signal from said pressure sensor and produce a control signal for controlling said controllable pressure control valve thus the supply of said hydraulic fluid to said hydraulic cylinder.

2. The agricultural implement of claim 1 in which said pressure sensor is a load cell or a strain gauge.

3. The agricultural implement of claim 1 in which said row unit includes multiple soil-engaging tools coupled to multiple support members, multiple hydraulic cylinders coupled to said multiple support members, multiple pressure sensors each of which is connected between one of said hydraulic cylinders and one of said support members, and a separate pressure control valve for each of said hydraulic cylinders, said controller is adapted to receive electrical signals from all said pressure sensors and produce multiple control signals for controlling all said pressure control valves and thus the supply of said hydraulic fluid to all said hydraulic cylinders.

4. The agricultural implement of claim 3 in which said controller is adapted to produce a separate control signal for each of said pressure control valves.

5. The agricultural implement of claim 1 which includes multiple row units each of which includes multiple soil-engaging tools coupled to multiple support members, multiple hydraulic cylinders coupled to said multiple support members, at least one pressure sensor connected between one of said hydraulic cylinders and one of said support members, a common supply line for supplying pressurized hydraulic fluid to all said hydraulic cylinders on said row unit, and a single pressure control valve for controlling the pressure of said hydraulic fluid supplied to all of said hydraulic cylinders on said row unit, and said controller is adapted to receive electrical signals from all said pressure sensors and produce multiple control signals for controlling all said pressure control valves and thus the supply of said hydraulic fluid to each of said row units.

6. The agricultural implement of claim 5 in which each of said hydraulic cylinders includes an associated accumulator having a fluid chamber containing a diaphragm forming a first fluid chamber coupled to the pressurized hydraulic fluid in said hydraulic cylinder, and a second fluid chamber containing a pressurized gas for urging said ram in a direction that pivots said support member in a direction opposite that of said hydraulic fluid.

7. The agricultural implement of claim 6 in which said accumulator is positioned adjacent to said hydraulic cylinder.

8. An agricultural row unit comprising:

an attachment frame adapted to be rigidly connected to a towing frame;

a support member pivotably coupled to said attachment frame to permit vertical pivoting movement of said support member relative to said attachment frame;

a soil-engaging tool coupled to said support member;

a hydraulic actuator having a ram movable into a cylinder, said ram being attached to the support member for urging said support member downwardly toward a soil surface;

a pressure sensor mounted in a position between said movable ram of said hydraulic cylinder and said support member, said pressure sensor producing an electrical signal corresponding to a force on said soil-engaging tool; and a controller coupled to said pressure sensor, said controller being programmed to receive said electrical signal from said pressure sensor and produce a control signal for dynamically controlling said cylinder.

9. The agricultural row unit of claim 8, wherein said pressure sensor is selected from a group consisting of a load cell and a strain gauge.

10. The agricultural row unit of claim 8, further comprising:

a hydraulic line coupled to said hydraulic actuator for supplying pressurized hydraulic fluid to said hydraulic actuator; and a controllable pressure control valve coupled to said controller and to said hydraulic line, said controllable pressure control valve, in response to said control signal, dynamically controlling the pressure of hydraulic fluid supplied to said cylinder through said hydraulic line.

11. The agricultural row unit of claim 8, wherein said hydraulic actuator further includes an accumulator having a fluid chamber, said fluid chamber containing a diaphragm between a first fluid chamber and a second fluid chamber, said first fluid chamber being coupled to pressurized hydraulic fluid in said cylinder, said second fluid chamber containing a pressurized gas for urging said ram in a direction that pivots said support member in a direction opposite that of said hydraulic fluid.

12. The agricultural row unit of claim 11, wherein said accumulator is positioned adjacent to said cylinder.

* * * * *

UNITED STATES PATENT AND TRADEMARK OFFICE
CERTIFICATE OF CORRECTION

| | | |
|---|---|---|
| PATENT NO. | : 8,763,713 B2 | Page 1 of 1 |
| APPLICATION NO. | : 13/359914 | |
| DATED | : July 1, 2014 | |
| INVENTOR(S) | : Joseph D. Bassett | |

It is certified that error appears in the above-identified patent and that said Letters Patent is hereby corrected as shown below:

In the Claims

Column 10, Line 20 (Claim 8, Line 13), remove the word "hydraulic."

Signed and Sealed this
Fourteenth Day of October, 2014

Michelle K. Lee
*Deputy Director of the United States Patent and Trademark Office*